United States Patent
Kang et al.

(10) Patent No.: US 12,314,953 B2
(45) Date of Patent: May 27, 2025

(54) VEHICLE AND SYSTEM FOR PREVENTING FREE RIDING

(71) Applicants: HYUNDAI MOTOR COMPANY, Seoul (KR); Kia Corporation, Seoul (KR)

(72) Inventors: Yim Ju Kang, Seoul (KR); Young Il Na, Hwaseong-si (KR); Hoon Lee, Gunpo-si (KR); Jae Nam Yoo, Incheon (KR); Chang Jae Lee, Yongin-si (KR); Wan Jae Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 111 days.

(21) Appl. No.: 17/969,208

(22) Filed: Oct. 19, 2022

(65) Prior Publication Data
US 2023/0214840 A1 Jul. 6, 2023

(30) Foreign Application Priority Data
Dec. 30, 2021 (KR) .................. 10-2021-0193234

(51) Int. Cl.
| | |
|---|---|
| G06Q 20/40 | (2012.01) |
| G06Q 20/10 | (2012.01) |
| G06V 10/74 | (2022.01) |
| G06V 10/82 | (2022.01) |
| G06V 40/16 | (2022.01) |
| G07B 15/02 | (2011.01) |

(52) U.S. Cl.
CPC ..... *G06Q 20/40145* (2013.01); *G06Q 20/102* (2013.01); *G06V 10/761* (2022.01); *G06V 10/82* (2022.01); *G06V 40/172* (2022.01); *G07B 15/02* (2013.01)

(58) Field of Classification Search
CPC .......... G06Q 20/40145; G06Q 20/102; G06V 10/761; G06V 10/82; G06V 40/172; G07B 15/02
See application file for complete search history.

(56) References Cited

FOREIGN PATENT DOCUMENTS

| | | | | |
|---|---|---|---|---|
| CN | 107798307 A | * | 3/2018 | ......... G06K 9/00288 |
| CN | 1077983307 | | 3/2018 | |
| KR | 10-2089618 B1 | | 4/2020 | |
| KR | 10-2109648 B1 | | 5/2020 | |
| WO | WO_2018074975 | * | 9/2017 | |
| WO | WO-2018074975 A1 | * | 4/2018 | ......... G06K 9/00288 |

* cited by examiner

*Primary Examiner* — Scott S Trotter
(74) *Attorney, Agent, or Firm* — Morgan Lewis & Bockius LLP

(57) ABSTRACT

A vehicle includes a first sensor for sensing a first image, a second sensor for sensing a second image, and a processor that generates identification information of an object based on the first image, matches the identification information with payment request information including information about fare payment of the object, generates location information of the object based on the second image, matches the identification information with the location information to generate boarding information of the object, and determines a free riding of the object based on the boarding information and payment approval information corresponding to the identification information.

20 Claims, 9 Drawing Sheets

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNING ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ LEVEL 2 SYSTEM MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL AND TRAVEL ENVIRONMENT MONITORING (DRIVER IS ABLE TO PREPARE EMERGENCY BY NECESSARILY RECEIVING RIGHT TO CONTROL WHEN LEVEL 3 SYSTEM REQUESTS CONTROL TO RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNING ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/ LEVEL 2 SYSTEM MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL AND TRAVEL ENVIRONMENT MONITORING (DRIVER IS ABLE TO PREPARE EMERGENCY BY NECESSARILY RECEIVING RIGHT TO CONTROL WHEN LEVEL 3 SYSTEM REQUESTS CONTROL TO RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

Fig.1

VEHICLE AND SYSTEM FOR PREVENTING FREE RIDING

CROSS-REFERENCE TO RELATED APPLICATION

This application claims the benefit of priority to Korean Patent Application No. 10-2021-0193234, filed in the Korean Intellectual Property Office on Dec. 30, 2021, the entire contents of which are incorporated herein by reference.

TECHNICAL FIELD

The present disclosure relates to an autonomous vehicle and an operating method thereof that prevent passengers from free riding.

BACKGROUND

In an existing vehicle carrying passengers, a driver was able to monitor fare payment of the passenger or the passenger was able to pay the fare through payment means included in the vehicle.

However, in an autonomous vehicle, boarding and alighting of the passenger are pertained automatically and there is no driver, so that it may be difficult to monitor or determine whether the passenger has paid the fare.

Therefore, a vehicle and a system for identifying the boarding and the alighting of the passenger and determining whether the passenger has paid the fare may be required.

SUMMARY

The present disclosure has been made to solve the above-mentioned problems occurring in the related art while maintaining the advantages achieved by the related art.

Conventionally, whether a passenger has paid a fare and boarding and alighting of the passenger were able to be identified by a driver. However, because the driver may be absent in an autonomous vehicle, it may be difficult to determine whether the passenger has paid the fare and to determine the boarding and the alighting of the passenger.

An aspect of the present disclosure provides an autonomous vehicle that determines whether a passenger has boarded the vehicle and whether the passenger has paid a fare. In addition, another aspect of the present disclosure provides a vehicle that identifies an identity of a boarded passenger and determines whether the passenger whose boarding is identified has paid a fare.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a vehicle includes a first sensor for sensing a first image, a second sensor for sensing a second image, and a processor that generates identification information of an object based on the first image, matches the identification information with payment request information including information about fare payment of the object, generates location information of the object based on the second image, matches the identification information with the location information to generate boarding information of the object, and determines whether the object has a free ride based on the boarding information and payment approval information corresponding to the payment request information.

In one implementation, the processor may further generate image information of the object and distance information between the first sensor and the object based on the first image, and generate the identification information based on the image information and the distance information.

In one implementation, the processor may further generate the payment request information based on the first image, and transmit the payment request information to a payment server.

In one implementation, the processor may further receive the payment approval information from the payment server, and determine that the object is not free riding when the payment approval information includes information corresponding to a payment success.

In one implementation, the processor may further sense the first image again through the first sensor when the identification information or the payment request information is not generated.

In one implementation, the processor may further request the object to change a location when the first sensor senses the first image again.

In one implementation, the processor may further request the object to input the payment request information or receive the payment request information from the outside when the payment request information is not generated for a preset number of times or more.

In one implementation, the vehicle may further include an input device for receiving the payment request information, and the processor may further match identification information of an object located closest to the input device with the payment request information and transmit the payment request information to a payment server when the payment request information is input.

In one implementation, the processor may further receive the payment approval information corresponding to the payment request information from the payment server, and determine that the object is not free riding when the payment approval information includes information corresponding to a payment success.

In one implementation, the processor may further determine that the object has the free ride when there is no payment approval information corresponding to the object.

In one implementation, the processor may further transmit identification information of the object who has the free ride to a control center, and the control center may store identity information corresponding to the identification information.

In one implementation, the processor may, in case of multi-men boarding, match identification information of objects capable of performing the multi-men boarding with payment request information of an object who has requested the multi-men boarding.

In one implementation, the processor may further match the identification information with the location information through a deep learning technique.

According to another aspect of the present disclosure, a system includes a vehicle including a first sensor for sensing a first image, a second sensor for sensing a second image, and a processor that generates identification information of an object based on the first image, matches the identification information with payment request information including information about fare payment of the object, generates location information of the object based on the second image, matches the identification information with the location information to generate boarding information of the object, and determines whether the object has a free ride based on the boarding information and payment approval information corresponding to the payment request information, a payment server for receiving the payment request information from the vehicle and transmitting the payment approval information to the vehicle, and a control center for storing identity information of an object who has the free ride based on the identification information when the object has the free ride.

In one implementation, the vehicle, in case of multi-men boarding, may match identification information of objects capable of performing the multi-men boarding with payment request information of an object who has requested the multi-men boarding.

In one implementation, the vehicle may further include an input device for receiving the payment request information, match identification information of an object located closest to the input device with the payment request information, and transmit the payment request information to the payment server when the payment request information is input.

In one implementation, the vehicle may receive the payment approval information corresponding to the payment request information from the payment server, and determine that the object is not free riding when the payment approval information includes information corresponding to a payment success.

In one implementation, the vehicle may generate the payment request information based on the first image, and the payment server may transmit the payment approval information corresponding to the payment request information to the vehicle.

According to another aspect of the present disclosure, a method for operating of a vehicle includes sensing, by a first sensor, a first image, generating, by a processor, identification information of an object based on the first image, matching, by the processor, the identification information with payment request information including information about fare payment of the object, sensing, by a second sensor, a second image, generating, by the processor, location information of the object based on the second image, matching, by the processor, the identification information with the location information to generate boarding information of the object, and determining, by the processor, whether the object has a free ride based on the boarding information and payment approval information corresponding to the identification information.

In one implementation, the matching of the identification information with the payment request information including the information about the fare payment of the object may include determining, by the processor, whether boarding is multi-men boarding, determining, by the processor, a number of boarding objects, and matching identification information of objects capable of performing the multi-men boarding with payment request information of an object who has requested the multi-men boarding.

BRIEF DESCRIPTION OF THE DRAWINGS

The above and other objects, features and advantages of the present disclosure will be more apparent from the following detailed description taken in conjunction with the accompanying drawings:

FIG. 1 is a table in which automation levels of an autonomous vehicle are defined;

DETAILED DESCRIPTION

Figure 2:
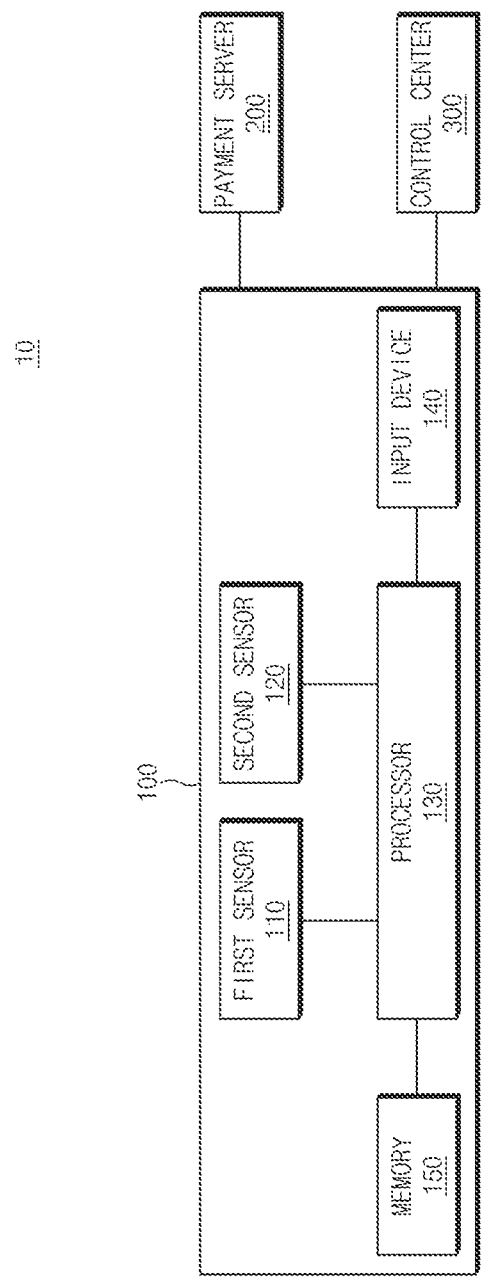
FIG. 2 is a block diagram for illustrating a free ride prevention system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function may be omitted when it may interfere with the understanding of the embodiment of the present disclosure.

In describing the components of the embodiment according to the present disclosure, terms such as first, second, A, B, (a), (b), and the like may be used. These teams are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a table in which automation levels of an autonomous vehicle are defined.

The autonomous vehicle refers to a vehicle that recognizes a travel environment by itself to determine a risk, minimizes travel manipulation of a driver while controlling a travel route, and drives by itself.

Ultimately, the autonomous vehicle refers to a vehicle capable of traveling, controlling, and parking without an influence of humans, and is focused on a vehicle in a state in which an autonomous driving technology, which is a core foundation of the autonomous vehicle, that is, an ability to operate the vehicle without active control or monitoring of the driver is the most advanced.

Referring to FIG. 1, in automation levels 0 to 2, the travel environment is monitored by the driver. On the other hand, in automation levels 3 to 5, the travel environment is monitored by an automated driving system.

However, a concept of the autonomous vehicle currently being released may include an automation step of an intermediate step to the autonomous vehicle in a full sense, and corresponds to a goal-oriented concept on the premise of mass production and commercialization of a fully autonomous vehicle.

An autonomous driving control method according to the present disclosure may be applied to autonomous vehicles corresponding to a level 2 (partial automation) and a level 3 (conditional automation) among the automation levels of the autonomous driving shown in FIG. 1, but may not be necessarily limited thereto, and may be applied to autonomous vehicles that support a plurality of various automation levels.

The automation level of the autonomous vehicle based on the society of automotive engineers (SAE), which is an American association of automotive Engineers, may be classified as shown in the table in FIG. 1.

FIG. 2 is a block diagram for illustrating a free ride prevention system according to an embodiment of the present disclosure.

FIG. 2 shows a free ride prevention system 10 of the autonomous vehicle including a vehicle 100, a payment server 200, and a control center 300.

The vehicle 100 may be a vehicle to which the automation level of the autonomous driving described in FIG. 1 is applied. As an example, the vehicle 100 may be a vehicle to which an automation level 4 or 5 may be applied and capable of responding to all situations without the driver. However, when there is no driver, there may be no means to monitor an object boarding the vehicle 100, so that it may be difficult to prevent the object from free riding.

The vehicle 100 may generate and store identification information of the object based on a collected image. The identification information, which is information for distinguishing objects boarding the vehicle 100, may correspond to each of the distinguished objects.

In addition, the vehicle 100 may generate location information of the object based on the collected image. For example, the location information of the object may be information corresponding to a location of the object in the vehicle 100 or adjacent to the vehicle 100.

The vehicle 100 may generate boarding information of the object by matching the location information with the identification information. The boarding information may include, for example, information on whether the object has boarded the vehicle 100.

The payment server 200 may be a server that transmits and receives payment request information and payment approval information corresponding to the object to and from the vehicle 100. The payment request information may include information about a boarding fare payment request of the object. The vehicle 100 may match the payment request information with the identification information, and may transmit the payment request information to the payment server 200.

The payment approval information may include information corresponding to whether fare payment is approved. For example, the payment approval information may include one of information corresponding to a fare payment success or information corresponding to a fare payment failure.

The payment server 200 may receive the payment request information for the object from the vehicle 100, and transmit the payment approval information corresponding to the received payment request information to the vehicle 100.

According to one embodiment, the vehicle 100 may generate the payment request information based on the collected image. As an example, the vehicle 100 may detect facial information of the object to identify an identity of the object from the collected image. According to one embodiment, the payment request information may include the facial information of the object.

The facial information may be information that is the basis of facial recognition, and the payment server 200 may identify the identity of the object through the facial recognition. The vehicle 100 may match the identification information generated from the collected image with the payment request information including the facial information and store the identification information and the payment request information in a memory 150.

The vehicle 100 may make a request for the fare payment of the object corresponding to the facial information to the payment server 200 based on the facial information. The vehicle 100 may transmit the payment request information corresponding to the identification information to the payment server 200.

The payment server 200 may identify the identity of the object from the facial information of the object included in the received payment request information, and determine whether the objects whose identities are identified have paid the fare. The payment server 200 may transmit the payment approval information corresponding to the identification information to the vehicle 100 based on a result of determining whether the fare is paid.

According to another embodiment, the payment request information may be information input from a separate input device 140 to the vehicle 100. As an example, the vehicle 100 may include the input device 140 that receives the payment request information, and may transmit the payment request information input through the input device 140 to the payment server by matching the payment request information with the identification information for the object. When the payment request information is input, the vehicle 100 may match identification information of an object located closest to the input device 140 with the payment request information.

The payment server 200 may determine whether the object corresponding to the identification information has paid the fare based on the received payment request information. The payment server 200 may transmit the payment approval information corresponding to the identification information to the vehicle 100 based on the result of determining whether the fare is paid.

The payment approval information may include information on whether the objects have paid the fare. When the payment approval information is not received or the payment approval information corresponding to the payment failure is received, the vehicle 100 may determine that the object has not paid the fare.

The control center 300 may receive identification information of the object who has not paid the fare from the vehicle 100, and search and store identity information corresponding to the received identification information among stored identity information.

The identity information may include information for identifying the identity of each object. In addition, the identity information may include personal information about the objects. The personal information about the objects may include image information, payment means information registered by the objects, vehicle 100 usage history information of the objects, and the like.

According to one embodiment, the control center 300 may receive the images from the vehicle 100. The control center 300 may monitor the objects through the received images.

The control center 300 may separately store identity information of an object who has the free ride, and may receive a report on the object who has the free ride. The control center 300 may monitor the objects who has the free ride among the objects whose identity information are stored.

The vehicle 100 may include a first sensor 110, a second sensor 120, and a processor 130. In addition, according to an embodiment, the vehicle 100 may further include the input device 140.

The first sensor 110 is a sensor that senses a first image. The first image may include an image corresponding to the object. The image corresponding to the object may include, for example, an image of the object boarding the vehicle 100.

The first sensor 110 may include, for example, at least one of a stereo camera, a 3D LIDAR, a monocular camera, and a thermal imaging camera.

The first sensor 110 may be installed such that an optical axis of the camera included in the first sensor 110 is horizontal to the ground. Therefore, the first image may include an image that captures the object in a direction horizontal to the ground.

In addition, the first image may contain the image information about the plurality of objects. For example, the image that captures the object in the direction horizontal to the ground may contain the facial information of the object, clothing information of the object, and the like.

According to one embodiment, the first sensor 110 may be located adjacent to a boarding location of the object. The first sensor 110 may be disposed at a location where it is easy to sense the images of the plurality of objects such that the processor 130 may distinguish the plurality of objects based on the first image.

The second sensor 120 is a sensor that senses a second image. The second image may include an image corresponding to the object. The object may include, for example, the object boarding the vehicle 100.

The second sensor 120 may include, for example, at least one of an image sensor and an infrared camera.

The second sensor 120 may be installed such that an optical axis of the camera included in the second sensor 120 is perpendicular to the ground. Accordingly, the second image may include an image that captures the object in a direction perpendicular to the ground.

According to one embodiment, the second image may contain the image information about the plurality of objects. The image that captures the object in the direction perpendicular to the ground may contain information about the location of the object in the vehicle 100 or adjacent to the vehicle 100.

According to one embodiment, the second sensor 120 may be located on a ceiling of a door of the vehicle 100. The second sensor 120 may be disposed such that the processor 130 may identify the locations of the plurality of objects based on the second image.

The processor 130 may be connected to the first sensor 110 and the second sensor 120, and may receive the first image and the second image from the sensors.

According to one embodiment, the processor 130 may identify and extract a characteristic (the image information) of each object based on the first image. In addition, the processor 130 may identify distance information corresponding to a distance between the first sensor 110 and the object based on the first image.

The processor 130 may distinguish the objects based on the distance information and the image information. In addition, the processor 130 may generate the identification information for each of the distinguished objects.

The processor 130 may generate the payment request information of each of the objects based on the first image. The processor 130 may detect the facial information of each object from the first image, and generate the payment request information including the detected facial information.

The facial information may be generated based on the distance information and the image information, and may include 3D (three-dimensional) depth information corresponding to a face of the object so as to recognize the face of the object and identify the identity. The processor 130 may match the identification information with the payment request information.

The image information, the distance information, the identification information, and the payment request information may be stored in the memory 150.

According to another embodiment, the vehicle 100 may receive the payment request information through the input device 140, and the processor 130 may transmit the received payment request information to the payment server 200. When the payment request information is input through the input device 140, the processor 130 may match the identification information of the object closest to the input device 140 with the identification information input through the input device 140.

The processor 130 may identify the locations of the objects in the vehicle 100 or adjacent to the vehicle 100 based on the second image. In addition, the location information of the object may be generated based on the identified location.

The processor 130 may match the location information generated based on the second image with the identification information generated based on the first image.

The processor 130 may generate the boarding information of the object for which the identification information and the location information match. According to one embodiment, the processor 130 may generate the boarding information of the object for which the identification information is generated.

The processor 130 may determine that objects for which the location information are 'inside the vehicle 100' among the objects for which the identification information are generated have boarded the vehicle 100 based on the boarding information.

When the boarding information is generated, the processor 130 may determine whether the object for which the boarding information is generated has the free ride based on the payment approval information.

The processor 130 may transmit the payment request information to the payment server 200, and the payment server 200 may generate the payment approval information for each object based on the received payment request information.

For example, the payment server 200 may determine whether the object corresponding to the received payment request information is able to pay the fare, and when the payment is possible, may generate the payment approval information including the information on the payment success and transmit the generated information to the processor 130.

When the identification information or the payment request information is not generated, the processor 130 may allow the first sensor 110 to re-sense the first image.

The processor 130 may request to adjust the location of the object through notification means included in the vehicle 100, and the first sensor 110 may re-sense the first image when the location of the object is adjusted.

According to one embodiment, when the identification information is generated, but the payment request information is not generated for a preset number of times or more, the processor 130 may request the object to input the payment request information through the input device 140, or may receive the payment request information from the outside.

According to another embodiment, the processor 130 may transmit a boarding unavailable notification to an object for which the identification information is not generated. In addition, the processor 130 may generate, through the second image, temporary identification information corresponding to an object for which the identification information is not generated but the location information is generated.

The processor 130 may transmit a boarding available notification or the boarding unavailable notification to the object. The notification may be transmitted through visual and audible notification means, and the notification means may include, for example, a notification lamp, a speaker, and the like included in the vehicle.

The input device 140 may be a device that receives the payment request information. The input device, which is a device capable of inputting the payment request information, may include, for example, a wireless payment device using a radio-frequency identification (RFID) technology. The input device 140 may be attached to an outer surface of the vehicle 100.

When the payment request information is input through the input device 140, the processor 130 may match the identification information and the payment request information of the object located closest to the input device 140 with each other and transmit the matched information to the payment server 200. The payment request information input through the input device 140 may contain a fare payment request for the object corresponding to the identification information (the object located closest to the input device 140 when the payment request information is input).

The processor 130 may receive the payment approval information corresponding to the payment request information from the payment server, and determine whether the object has the free ride based on the received payment approval information and the boarding information of the object.

For example, when the boarding information of the object is generated, but the payment approval information is not received, or when the received payment approval information includes the information corresponding to the payment failure, the processor 130 may determine the object as the object who has the free ride. On the other hand, when the boarding information of the object is generated and the payment approval information including the information corresponding to the payment success is received, the processor 130 may determine that the object is not the object who has the free ride. In some embodiments, the processor 130 may include at least one processor and software instructions to execute the functions of the processor 130.

The vehicle 100 may further include the memory 150. The memory 150 may store the information collected through the first sensor 110 and the second sensor 120, and may store the identification information, the location information, the payment request information, the payment approval information, and the like. The information stored in the memory 150 may be stored corresponding to each of the objects.

Figure 3:
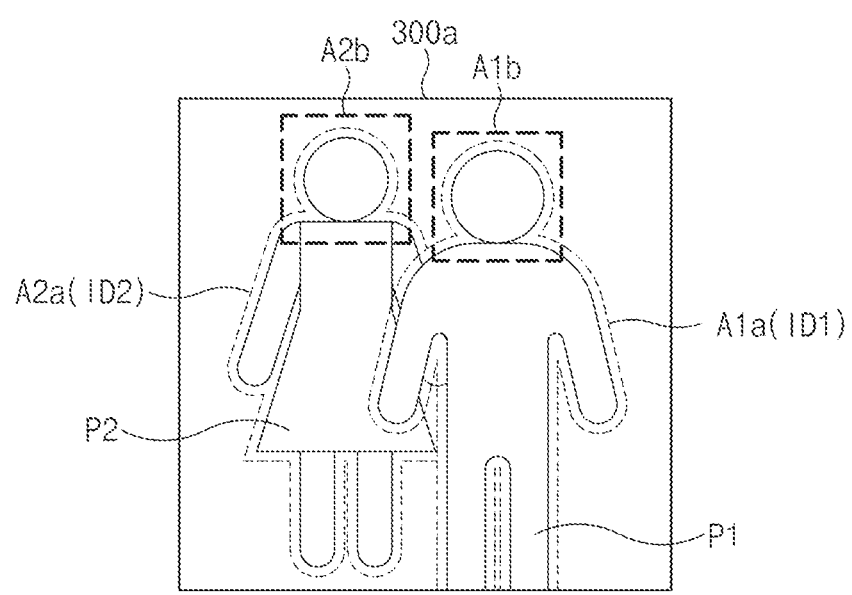
FIG. 3 exemplarily illustrates a first image according to an embodiment of the present disclosure.

FIG. 3 exemplarily illustrates a first image according to an embodiment of the present disclosure.

FIG. 3 is for illustrating a method for distinguishing, by the processor 130, objects based on an image sensed by a first sensor (110 in FIG. 1), and generating identification information and payment request information of the object.

FIG. 3 shows a first image 300*a* that captures objects in the direction horizontal to the ground. The optical axis of the camera included in the first sensor 110 may be horizontal with respect to the ground.

The first image 300*a* may contain a plurality of objects P1 and P2. The objects may be passengers boarding the vehicle 100.

The first sensor 110 may include, for example, a plurality of sensors for sensing the image information and the distance information, and the processor 130 may generate identification information based on image information and distance information of the objects contained in the first image 300*a*.

The processor 130 may generate image information of the first object P1 based on the first image 300*a* and may generate image information of the second object P2 based on the first image 300*a*. In addition, the processor 130 may generate distance information between the first sensor 110 and the first object P1 and distance information between the first sensor 110 and the second object P2, respectively.

The image information may contain a shape and a color characteristic of each object. As an example, the image information may include information about a hair color, an ornament color, clothing color and shape, and the like of the object.

The distance information may include information about the distance between the first sensor 110 and the object and a relative distance between the objects. In addition, the distance information may include depth information about the object. The depth information may be information corresponding to a depth between a sensing target and the first sensor 110, and the processor 130 may generate information about 3D shapes of the objects based on the distance information.

According to one embodiment, the processor 130 may distinguish a plurality of regions A1*a* and A2*a* contained in the first image 300*a* based on the image information and the distance information. The processor 130 may determine objects located in the respective regions contained in the first image 300*a* as different objects. The processor 130 may generate identification information respectively corresponding to the objects located in the different regions.

For example, the processor 130 may distinguish the first object region A1*a* corresponding to the first object P1 from the second object region A2*a* corresponding to the second object P2. In addition, the processor 130 may match first identification information ID1 with the first object P1 and match second identification information ID2 with the second object P2.

In one embodiment, the processor 130 may independently extract a region for generating the payment request information of each object from the first image 300*a*.

For example, the regions for generating the payment request information of the objects may be regions containing facial information of the objects contained in the image. The region containing the facial information may be referred to as a facial region. The facial information may include 3D shape information about faces of the objects.

According to one embodiment, the processor 130 may detect the facial region for each of the objects with the different identification information, and generate the payment request information including the facial information for each object.

As an example, a facial region for identifying an identity of each object may be a region including the facial region of the region corresponding to each object. Referring to FIG. 3, a region for generating payment request information corresponding to the first object P1 may be a first facial region A1b, and a region for generating payment request information corresponding to the second object P2 may be a second facial region A2b.

The processor 130 may match the identification information with the payment request information and store the matched information in the memory 150.

Figure 4:
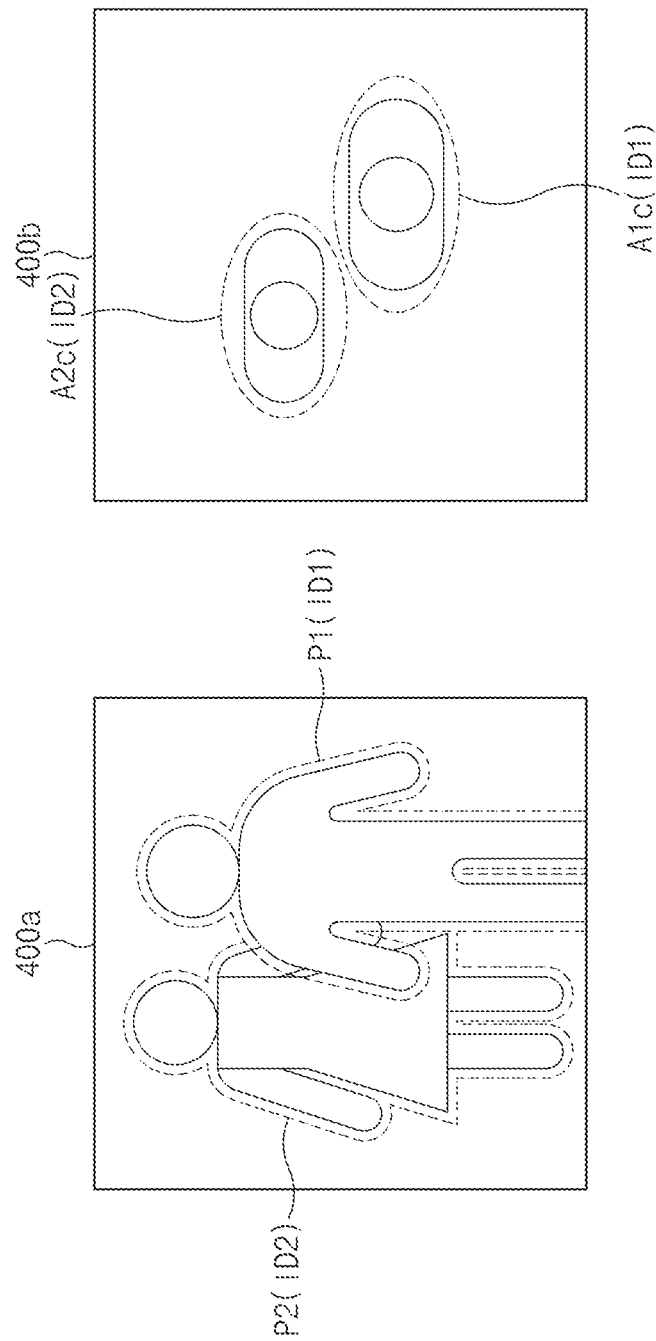
FIGS. 4A and 4B each exemplarily illustrates a first image and a second image, respectively, according to an embodiment of the present disclosure.

FIGS. 4A and 4B each exemplarily illustrates a first image and a second image, respectively, according to an embodiment of the present disclosure.

FIGS. 4A and 4B are for illustrating a method for distinguishing, by the processor 130, objects based on an image sensed by a second sensor (120 in FIG. 1), and generating location information of the object to generate boarding information.

FIG. 4A shows a first image 400a that captures objects in the direction horizontal to the ground, and FIG. 4B shows a second image 400b that captures objects in the direction perpendicular to the ground. When the optical axis of the camera included in the second sensor 120 is perpendicular to the ground, the object may be captured in the direction horizontal to the ground.

The first image 400a may contain the plurality of objects P1 and P2, and the objects P1 and P2 may be the passengers boarding the vehicle 100. Referring to the description of FIG. 3, the objects P1 and P2 may respectively have the different identification information ID1 and ID2. In addition, the processor 130 may distinguish the regions where the objects are respectively located, and respectively match the objects P1 and P2 located in the different regions with the identification information ID1 and ID2.

The first object P1 of the first image 400a may correspond to the first identification information ID1, and the second object P2 may correspond to the second identification information ID2.

The second image 400b may contain location information of the plurality of objects. The second image 400b may contain the regions respectively corresponding to the plurality of objects.

The optical axis of the camera included in the second sensor 120 may be positioned perpendicular to the ground. Accordingly, the second image 400b is an image that captures the objects in the direction perpendicular to the ground, so that the second image 400b may include image information about top surfaces of the objects.

The processor 130 may match the identification information ID1 and ID2 respectively corresponding to the objects contained in the first image 400a to the objects of the second image 400b, respectively.

The processor 130 may match the objects of the first image 400a with the objects of the second image 400b based on the image information of the objects and the distance information between the objects distinguished in the first image 400a, thereby matching the generated identification information with the objects of the second image 400b.

According to one embodiment, the processor 130 may learn the identity matching between the object image of the first image 400a and the object image of the second image 400b using a convolutional neural network (CNN) deep learning technique, and match the identification information with the matched objects.

The second image 400b may contain a plurality of planar regions A1c and A2c respectively corresponding to the objects, and the processor 130 may distinguish the objects respectively corresponding to the different planar regions. The planar regions A1c and A2c may refer to regions in which the objects are located with respect to a plane when viewed in the direction perpendicular to the ground.

In addition, the processor 130 may respectively match the objects of the first image 400a with the objects distinguished in the second image 400b, and match each object with the identification information.

As an example, the first planar region A1c of the second image 400b may correspond to the first object P1 and may correspond to the first identification information ID1. In addition, the second planar region A2c may correspond to the second object P2 and may correspond to the second identification information ID2.

The processor 130 may generate the location information of the object from the second image 400b. The processor 130 may extract the planar regions A1c and A2c respectively corresponding to the objects from the second image 400b, and generate the location information of the objects based on locations of the planar regions A1c and A2c.

The processor 130 may generate the boarding information of the object by matching the generated location information of the object with the identification information of the object. In other words, the boarding information may include the location information of the identified object. The processor 130 may generate the boarding information for the objects having the identification information.

Figure 5:
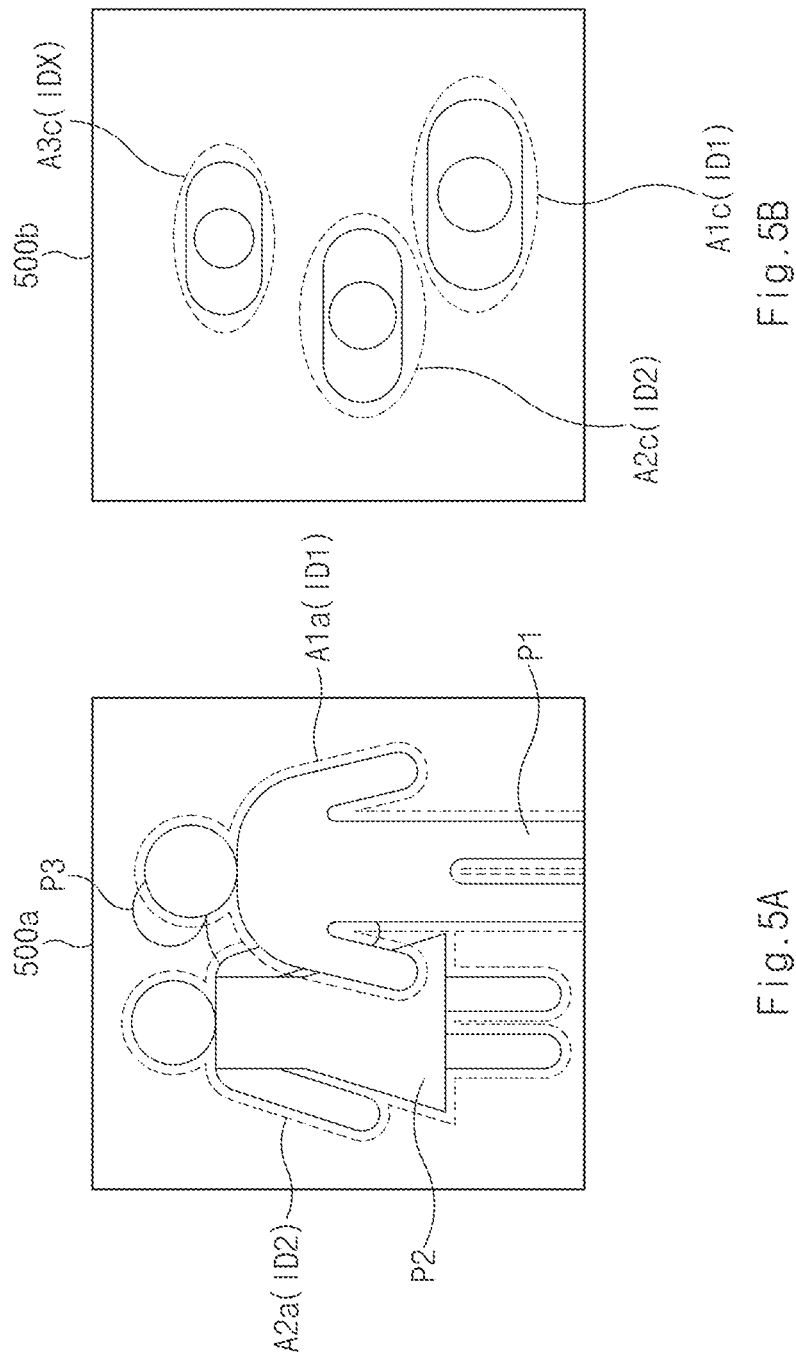
FIGS. 5A and 5B each exemplarily shows a first image and a second image, respectively, according to another embodiment of the present disclosure.

FIGS. 5A and 5B each exemplarily shows a first image and a second image, respectively, according to another embodiment of the present disclosure.

FIGS. 5A and 5B each shows a first image 500a and a second image 500b, respectively. As described above, the first image 500a may be the image collected through the first sensor 110, and the second image 500b may be the image collected through the second sensor 120.

The optical axis of the camera included in the first sensor 110 may be horizontal to the ground, and the first image may be the image that captures the object in the direction horizontal to the ground. In addition, the optical axis of the camera included in the second sensor 120 may be perpendicular to the ground, and the second image may be the image that captures the object in the direction perpendicular to the ground.

The first image 500a of FIG. 5A may contain a plurality of objects. As an example, the first image 500a may include the first object P1, the second object P2, and a third object P3.

Depending on the location of the object, the first sensor 110 may not be able to generate the identification information or the payment request information of the object.

For example, when the object is not able to be captured by the first sensor 110 because of an obstruction, or when the first image sensed by the first sensor 110 does not contain the facial information of the object, the processor 130 may not be able to generate the identification information or the payment request information of the object from the first image.

When the identification information or the payment request information of the object is not generated, the processor 130 may sense the first image again through the first sensor 110. When sensing the first image again through the first sensor 110, the processor 130 may request the object to change the location thereof.

According to one embodiment, when the identification information is not generated for the preset number of times or more, the processor 130 may output the boarding unavailable notification to the object.

According to another embodiment, when the payment request information is not generated for the preset number of times or more, the processor 130 may separately request the object to input the payment request information through the input device 140 or may receive the payment request information from the outside. When receiving the payment request information, the processor 130 may match the input payment request information with the identification information of the object closest to the input device 140.

In the first image 500*a* of FIG. 5A, the third object P3 may be covered by the first object P1, and the processor 130 may not be able to generate identification information and payment request information of the third object P3 from the first image 500*a*.

The processor 130 may generate the location information of the objects in the second image 500*b* sensed through the second sensor 120, respectively. As described above, the location information of the objects may be generated by extracting planar regions A1*c*, A2*c*, and A3*c* in which the objects are respectively located in the second image 500*b*.

The processor 130 may request the third object P3 for which the identification information and the payment request information are not generated to change a location thereof. According to an embodiment, the processor 130 may request the object to change the location thereof up to 3 times.

After requesting the location change, the first sensor 110 may sense the first image again. When the identification information is not generated even though the location change is requested for a preset number of times, the processor 130 may transmit the boarding unavailable notification to the third object P3.

When the identification information is not generated but the location information is generated, the processor 130 may generate temporary identification information IDX corresponding to the object (e.g., the third object P3) for which the location information is generated. When it is determined that the object (e.g., the third object P3) has boarded the vehicle, the processor 130 may determine that the object has the free ride based on the location information of the object corresponding to the temporary identification information IDX.

According to another embodiment, the processor 130 may request the object for which the identification information is generated but the payment information is not generated to input the payment request information.

Figure 6:
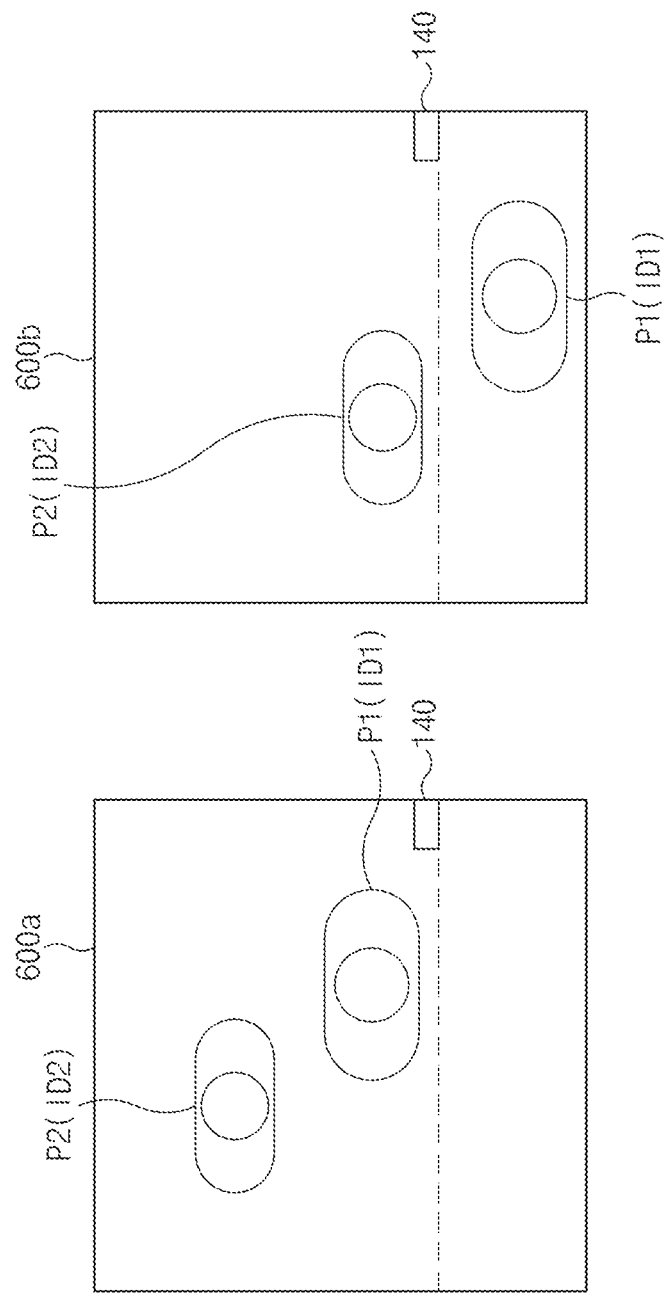
FIGS. 6A and 6B each exemplarily illustrates second images, respectively, according to another embodiment of the present disclosure.

FIGS. 6A and 6B each exemplarily illustrates second images, respectively, according to another embodiment of the present disclosure.

FIGS. 6A and 6B are for illustrating a payment request information collection method and a free ride determination method of the processor according to another embodiment of the present disclosure.

FIGS. 6A and 6B may illustrate the input device 140 installed on the vehicle 100 and the objects P1 and P2 boarding the vehicle.

The input device 140 may be installed to be mounted on an outer surface of the vehicle 100. As the input device 140 is mounted on the outer surface of the vehicle 100, the objects may easily input the payment request information.

In second images 600*a* and 600*b* shown in FIGS. 6A and 6B, respectively, a portion indicated by a dotted line may be a boundary dividing an interior and an exterior of the vehicle 100, and the input device 140 may be located at the boundary between the interior and the exterior of the vehicle 100.

The second images 600*a* and 600*b* shown in FIGS. 6A and 6B, respectively, may be images sensed by the second sensor 120. According to the embodiment, the second sensor 120 may be located on the ceiling of the door of the vehicle 100.

The second sensor 120 may sense a second image of an object who has not boarded the vehicle and an object who has boarded the vehicle. The image collected through the second sensor 120 may be the image that captures the object in the direction perpendicular to the ground.

As an example, after the second image 600*a* is sensed, the second image 600*b* may be sensed.

The processor 130 may collect the location information of the objects P1 and P2 through the image collected through the second sensor 120. In addition, the processor 130 may generate the identification information ID1 and ID2 of the objects P1 and P2 through the image collected by the first sensor 110, and may respectively match the generated identification information ID1 and ID2 with the objects.

The processor 130 may generate the boarding information of each object by matching the identification information with the location information.

According to an embodiment, the processor 130 may receive the payment request information through the input device 140, and match the received payment request information with the identification information of the object and transmit the matched information to the payment server 200.

When receiving the payment request information through the input device 140, the processor 130 may match the identification information of the object located closest to the input device 140 with the payment request information and transmit the matched information to the payment server 200 when the payment request information is input. The processor 130 may determine the distance between the input device 140 and the object based on the first image or the second image.

The processor 130 may receive the payment approval information corresponding to the payment request information from the payment server 200, and determine that the object is an object having successful payment approval information when payment approval information corresponding to fare payment success is received.

The processor 130 may transmit the boarding available notification to the object who is not free riding. In addition, the processor 130 may transmit the boarding unavailable notification to the object who has the free ride. The notification may be transmitted through the visual and auditory notification means, and the notification means may include, for example, the notification lamp, the speaker, and the like included in the vehicle.

As an example, the first object P1 having the first identification information ID1 in the left second image 600*a* of FIG. 6A may input the payment request information through the input device 140 and board the vehicle. The processor 130 may match the input payment request information with the first identification information ID1 of the first object P1 based on the location information of the first object P1 and the second object P2.

In the right second image 600*b* of FIG. 6B, the processor 130 may receive the payment approval information for the payment request information corresponding to the first identification information from the payment server 200.

When the processor 130 receives the payment approval information, the processor 130 may determine that the first object P1 is not free riding. In this regard, the location information of the first object P1 may be determined to be a location inside the vehicle 100, and the processor 130 may determine that the first object P1 has boarded the vehicle 100. Accordingly, the processor 130 may transmit the boarding available notification to the first object P1.

On the other hand, in the case of the second object P2, the processor 130 may determine that the payment request information corresponding to the second identification information ID2 has not been received through the input device 140. When the payment request information corresponding to the second identification information ID2 is not generated, the processor 130 may not be able to receive the corresponding payment approval information. Accordingly, the processor 130 may transmit the boarding unavailable notification to the second object P2.

According to another embodiment, the boarding of the objects may be multi-men boarding. The multi-men boarding may mean a case in which payment request information for a plurality of objects are contained in payment request information of an object requesting the multi-men boarding.

Accordingly, the processor 130 may match identification information of the objects corresponding to the multi-men boarding with the payment request information of the object (a first boarding object) that has requested the multi-men boarding.

During the multi-men boarding, when receiving the payment request information of the object requesting the multi-men boarding, the processor 130 may determine that objects, which do not have the separate payment request information, of the number equal to or smaller than the number of multi-men boarding people are not having the free ride.

For example, when the payment request information input by the first object P1 of FIGS. 6A and 6B contains payment request information of two or more people, even when the second object P2 does not separately input the payment request information and the payment approval information corresponding to the second object P2 is not separately received, the processor 130 may not determine that the second object P2 has the free ride.

Figure 7:
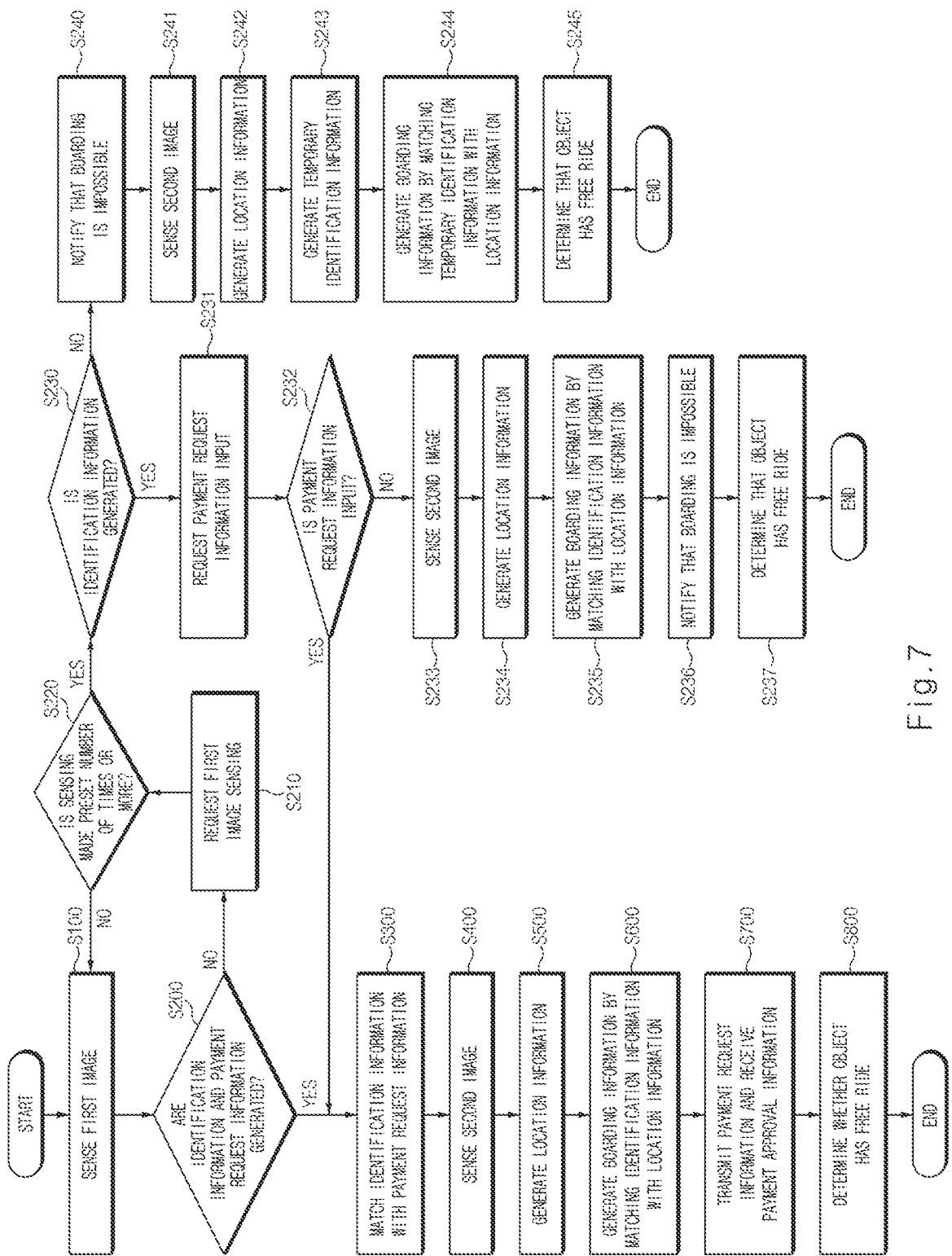
FIG. 7 is a view illustrating an operating method of a free ride prevention vehicle according to an embodiment of the present disclosure.

FIG. 7 is a view illustrating an operating method of a free ride prevention vehicle according to an embodiment of the present disclosure.

According to FIG. 7, the vehicle 100 may sense the first image through the first sensor 110 (S100). The first image may be the image of the object collected in the direction horizontal to the ground.

The processor 130 may determine whether the identification information and the payment request information for the object may be generated from the first image (S200).

When the identification information and the payment request information are generated (a YES path in S200), the processor 130 may match the identification information with the payment request information (S300).

When at least one of the identification information and the payment request information is not generated (a NO path in S200), the processor 130 may request the first sensor 110 to sense the first image again (S210). In this regard, the processor 130 may request the object to change the location thereof.

In addition, the processor 130 may determine whether the first image sensing request for the first sensor 110 is made a preset number of times or more (S220). The preset number of times may vary according to an embodiment. As an example, the preset number may be 3.

When the processor 130 does not request the image sensing the preset number of times or more for the first sensor 110 (a NO path in S220), the first sensor 110 may sense the first image again, and the processor 130 may generate the identification information and the payment request information based on the first image sensed again.

According to one embodiment, when the processor 130 requests the image sensing the preset number of times or more for the first sensor 110 (a YES path in S220), the processor 130 may determine whether the identification information is generated (S230).

When the identification information is generated, but the payment request information is not generated (a YES path in S230), the processor 130 may request the payment request information input through the input device 140 (S231).

The processor 130 may determine whether the payment request information is input (S232).

When the payment request information is input (a YES path in S232), the processor 130 may match the identification information with the payment request information (S300).

When the payment request information is not input (a NO path in S232), the second sensor 120 may sense the second image (S233).

The processor 130 may generate the location information based on the sensed second image (S234).

The processor 130 may generate the boarding information by matching the identification information with the location information (S235).

Thereafter, the processor 130 may perform notifying the object for which the payment request information is not generated or input that the boarding is impossible (S236), and determining, by the processor 130, that the object for which the payment request information is not generated or input has the free ride (S237).

Thereafter, the processor 130 may transmit the identification information for the object who has the free ride to the control center 300.

When the identification information is not generated (a NO path in S230), the processor 130 may notify the object for which the identification information is not generated that the boarding is impossible (S240). The boarding unavailable notification may be transmitted through the notification means included in the vehicle 100.

After the boarding unavailable notification, the second sensor 120 may sense the second image (S241), and the processor 130 may generate the location information based on the second image (S242).

Thereafter, the processor 130 may generate the temporary identification information corresponding to the object for which the identification information is not generated but the location information is generated (S243).

The processor 130 may generate the boarding information by matching the temporary identification information with the location information (S244), and determine whether the object corresponding to the temporary identification information has boarded the vehicle 100 based on the generated boarding information.

The processor 130 may determine that, when the object corresponding to the temporary identification information has boarded the vehicle 100, the object has the free ride (S245).

In another embodiment of the present disclosure, instead of determining whether the identification information and the payment information are generated from the first image, the processor 130 may only determine whether the identification information is generated.

The processor 130 may determine whether the identification information is generated, and, when the identification information is not generated even after the sensing for the preset number of times, notify the object that the boarding is impossible (S240).

When the identification information is generated within the preset number of times, the input of the payment request information through the input device 140 may be requested to the object (S231). Thereafter, the payment request information input and the free ride determination method may proceed in the same operations as in the embodiment described above.

When the identification information and the payment request information are generated and match with each other, the second sensor 120 may sense the second image (S400). The processor 130 may generate the location information of the object based on the sensed second image (S500).

The processor 130 may generate the boarding information of the object by matching the identification information with the location information (S600).

Thereafter, the processor 130 may determine whether the object has the free ride by transmitting and receiving the payment request information and the payment approval information (S700 and S800).

Specifically, the operation of determining whether the object has the free ride may include determining whether the object has boarded the vehicle 100 based on the boarding information, transmitting, by the vehicle 100, the payment request information to the payment server 200, and receiving the payment approval information from the payment server 200 (S700), and determining whether the object has the free ride based on the boarding information and the payment approval information corresponding to the identification information (S800).

The processor 130 may match the identification information with the location information through the deep learning technique, and may, for example, extract the same object contained in the images by comparing the image information of the first image with the image information of the second image, and match the identification information with the same object.

When it is determined that the object has boarded, but the payment approval information corresponding to the payment request information is not able to be received, or the payment approval information including the information about the payment failure is received, the processor 130 may determine that the object has the free ride.

The processor 130 may transmit the identification information of the object determined to have the free ride to the control center 300. The control center 300 may store the identity information corresponding to the identification information, and may monitor the object corresponding to the stored identity information.

Figure 8:
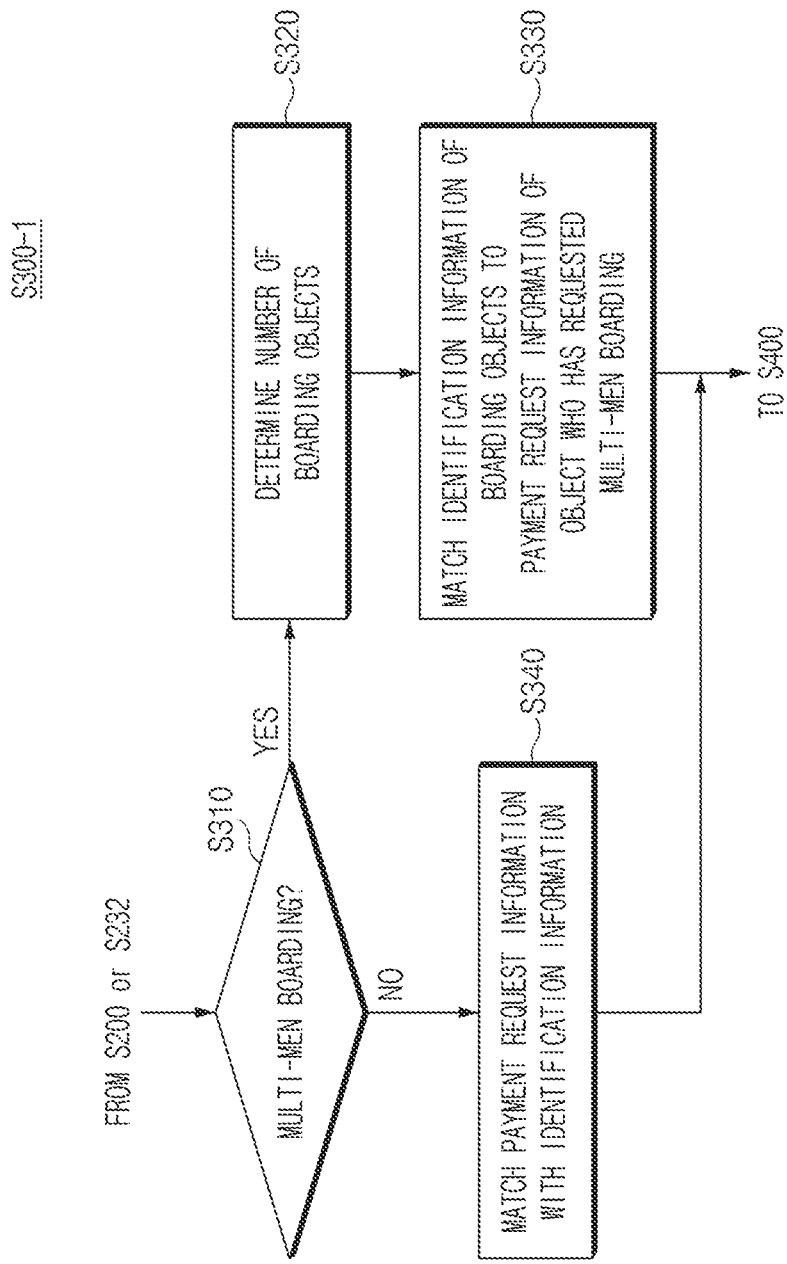
FIG. 8 illustrates an operating method of a free ride prevention vehicle during multi-men boarding according to an embodiment of the present disclosure.

FIG. 8 illustrates an operating method of a free ride prevention vehicle during multi-men boarding according to an embodiment of the present disclosure.

A method (S300-1) for the processor 130 to respond to the identification information and the payment request information in the multi-men boarding is illustrated through FIG. 8.

In the case of the multi-men boarding, the payment request information for the object who has requested the multi-men boarding may be generated or input, but the payment request information for the objects other than the object who has requested the multi-men boarding may not be generated or input separately.

In the multi-men boarding, the processor 130 may determine whether the boarding is the multi-men boarding (S310).

When the boarding is not the multi-men boarding (a NO path in S310), the processor 130 may match the identification information and the payment request information for each object.

In the case of the multi-men boarding (a YES path in S310), the number of boarding objects may be determined based on the payment request information of the object who has requested the multi-men boarding (S320).

According to an embodiment, when inputting the payment request information corresponding to the multi-men boarding, the processor 130 may determine the object adjacent to the input device 140 as the object who has requested the multi-men boarding.

The payment request information corresponding to the multi-men boarding may include information about the number of boarding objects. The processor 130 may count the boarding objects such that the object who has requested the multi-men boarding is included (S320).

The processor 130 may match the identification information of the objects determined to be able to perform the multi-men boarding to the payment request information of the object who has requested the multi-men boarding (S330).

By matching the identification information of the objects of the number equal to or smaller than the number of boarding people to the payment request information of the object who has requested the multi-men boarding, the objects of the number equal to or smaller than the number of multi-men boarding people for which the payment request information are not separately generated or input may be determined to not have the free ride.

In the multi-men boarding, the processor 130 may transmit one payment request information to which the plurality of identification information correspond, and may receive the corresponding payment approval information.

The processor 130 may determine whether the objects have the free ride during the multi-men boarding based on the received payment approval information.

Figure 9:
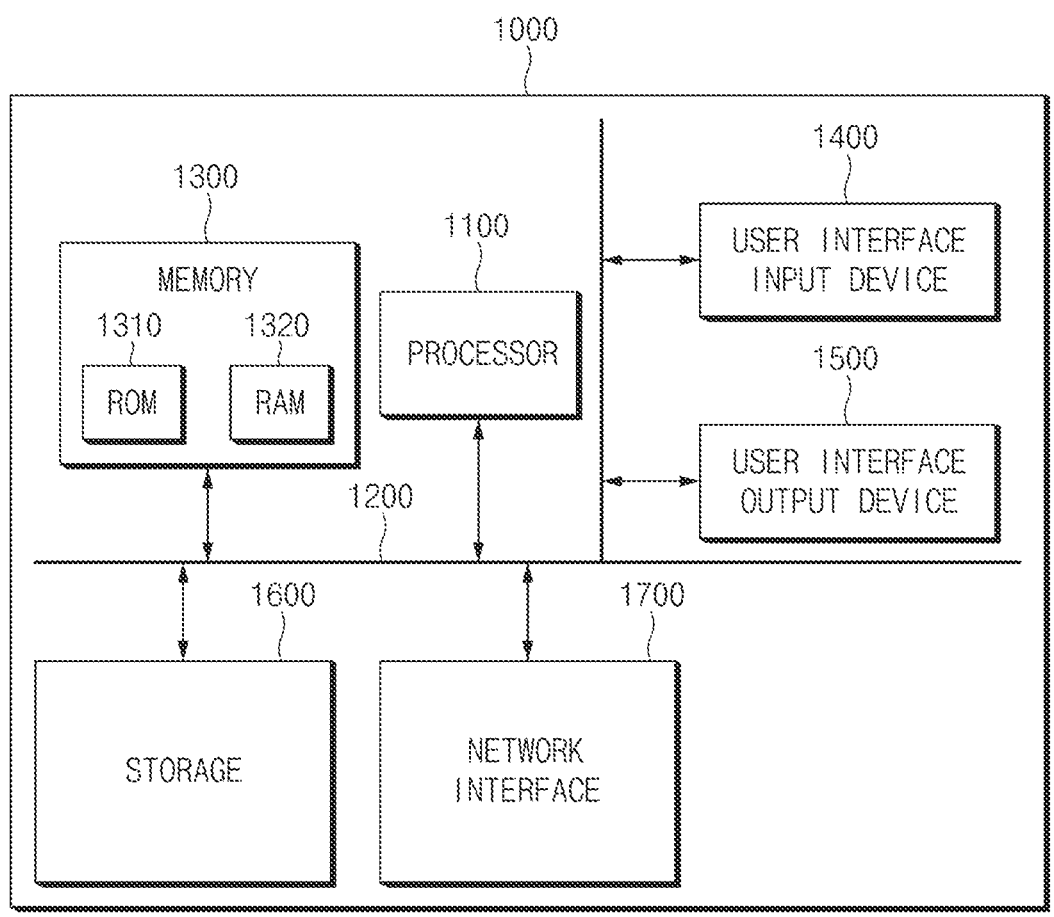
FIG. 9 is a block diagram illustrating a computing system for executing a free ride prevention system according to an embodiment of the present disclosure.

FIG. 9 is a block diagram illustrating a computing system for executing a free ride prevention system according to an embodiment of the present disclosure.

Referring to FIG. 9, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a Read Only Memory (ROM) and a Random Access Memory (RAM).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor 1100 and the storage medium may reside within an application specific integrated circuit (ASIC). The ASIC may reside within the user terminal. In another method, the processor 1100 and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present disclosure provides the vehicle that generates the boarding information of the object in the autonomous vehicle, and automatically receives the fare of the boarded object.

In addition, the vehicle of the present disclosure may sense the images through the plurality of sensors, and generate the boarding information and the payment request information of the object based on the sensed images.

The present disclosure may determine whether the payment of the object boarded the vehicle is approved and determine whether the object has the free ride without separate monitoring means or the driver.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle comprising:
   a first sensor for sensing a first image;
   a second sensor for sensing a second image; and
   a processor configured to:
      generate identification information of an object based on the first image;
      match the identification information with payment request information including information about fare payment of the object;
      generate location information of the object based on the second image;
      match the identification information with the location information to generate boarding information of the object;
      determine whether the object has a free ride based on the boarding information and payment approval information corresponding to the payment request information; and
      output the boarding unavailable notification to the object visually by a notification lamp and auditorily by a speaker, in response that the identification information is not generated for a preset number of times or more.

2. The vehicle of claim 1, wherein the processor is further configured to:
   generate image information of the object and distance information between the first sensor and the object based on the first image; and
   generate the identification information based on the image information and the distance information.

3. The vehicle of claim 1, wherein the processor is further configured to:
   generate the payment request information based on the first image; and
   transmit the payment request information to a payment server.

4. The vehicle of claim 3, wherein the processor is further configured to:
   receive the payment approval information from the payment server; and
   determine that the object is an object having successful payment approval information when the payment approval information includes information corresponding to a payment success.

5. The vehicle of claim 3, wherein the processor is further configured to sense the first image again through the first sensor when the identification information or the payment request information is not generated.

6. The vehicle of claim 5, wherein the processor is further configured to request the object to change a location when the first sensor senses the first image again.

7. The vehicle of claim 4, wherein the processor is further configured to request the object to input the payment request information or receive the payment request information from the outside when the payment request information is not generated for a preset number of times or more.

8. The vehicle of claim 1, further comprising:
   an input device for receiving the payment request information,
   wherein the processor is further configured to:
      match identification information of an object located closest to the input device with the payment request information; and
      transmit the payment request information to a payment server when the payment request information is input.

9. The vehicle of claim 8, wherein the processor is further configured to:
   receive the payment approval information corresponding to the payment request information from the payment server; and
   determine that the object is an object having successful payment approval information when the payment approval information includes information corresponding to a payment success.

10. The vehicle of claim 1, wherein the processor is further configured to determine that the object has the free ride when there is no payment approval information corresponding to the object.

11. The vehicle of claim 10, wherein the processor is further configured to transmit identification information of the object who has the free ride to a control center,
   wherein the control center stores identity information corresponding to the identification information.

12. The vehicle of claim 10, wherein the processor is further configured to, in case of multi-men boarding, match identification information of multi-men boarding objects with payment request information of an object who has requested the multi-men boarding.

13. The vehicle of claim 1, wherein the processor is further configured to match the identification information with the location information through a deep learning technique.

14. A system comprising:
a vehicle including:
  a first sensor for sensing a first image;
  a second sensor for sensing a second image; and
  a processor configured to generate identification information of an object based on the first image, match the identification information with payment request information including information about fare payment of the object, generate location information of the object based on the second image, match the identification information with the location information to generate boarding information of the object, determine whether the object has a free ride based on the boarding information and payment approval information corresponding to the payment request information, output a boarding unavailable notification to the object visually by a notification lamp and auditorily by a speaker, in response that the identification information is not generated for a preset number of times or more, and transmit identification information of the object who has the free ride to a control center,
a payment server for receiving the payment request information from the vehicle and transmitting the payment approval information to the vehicle; and
the control center for storing identity information of the object who has the free ride based on the identification information when the object has the free ride and for monitoring the object who has the free ride.

15. The system of claim 14, wherein the vehicle, in case of multi-men boarding, matches identification information of multi-men boarding objects with payment request information of an object who has requested the multi-men boarding.

16. The system of claim 14, wherein the vehicle further includes an input device for receiving the payment request information, matches identification information of an object located closest to the input device with the payment request information, and transmits the payment request information to the payment server when the payment request information is input.

17. The system of claim 16, wherein the vehicle receives the payment approval information corresponding to the payment request information from the payment server, and determines that the object is an object having successful payment approval information when the payment approval information includes information corresponding to a payment success.

18. The system of claim 14, wherein the vehicle generates the payment request information based on the first image,
wherein the payment server transmits the payment approval information corresponding to the payment request information to the vehicle.

19. A method for operating of a vehicle, the method comprising:
sensing, by a first sensor, a first image;
generating, by a processor, identification information of an object based on the first image;
matching, by the processor, the identification information with payment request information including information about fare payment of the object;
sensing, by a second sensor, a second image;
generating, by the processor, location information of the object based on the second image;
matching, by the processor, the identification information with the location information to generate boarding information of the object; and
determining, by the processor, whether the object has a free ride based on the boarding information and payment approval information corresponding to the identification information; and
outputting the boarding unavailable notification to the object visually by a notification lamp and auditorily by a speaker, in response that the identification information is not generated for a preset number of times or more, and
transmitting identification information of the object who has the free ride to a control center, so that the control center stores the identity information of the object who has the free ride based on the identification information when the object has the free ride and monitor the object.

20. The method of claim 19, wherein the matching of the identification information with the payment request information including the information about the fare payment of the object includes:
determining, by the processor, whether boarding is multi-men boarding;
determining, by the processor, a number of boarding objects; and
matching, by the processor, identification information of multi-men boarding objects with payment request information of an object who has requested the multi-men boarding.

* * * * *